D. B. McCOLLUM.
ANTISKIDDING DEVICE FOR TIRES.
APPLICATION FILED FEB. 9, 1916.
1,261,827.
Patented Apr. 9, 1918.
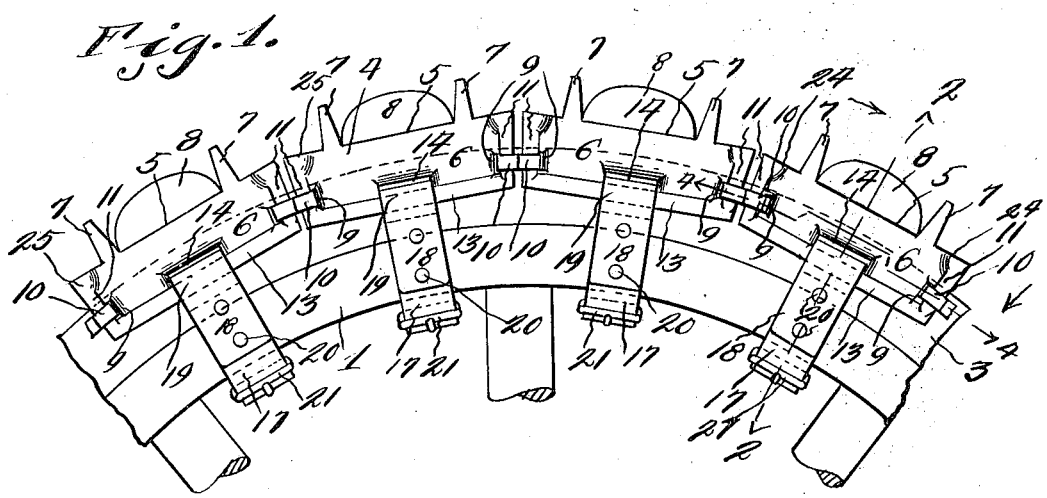
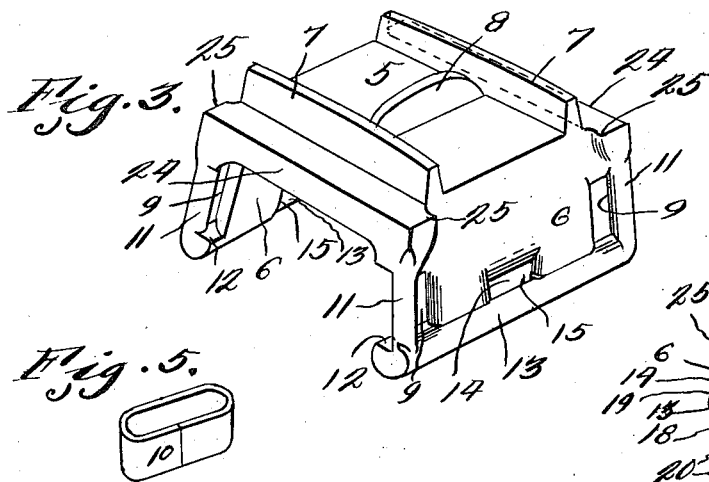
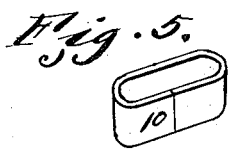
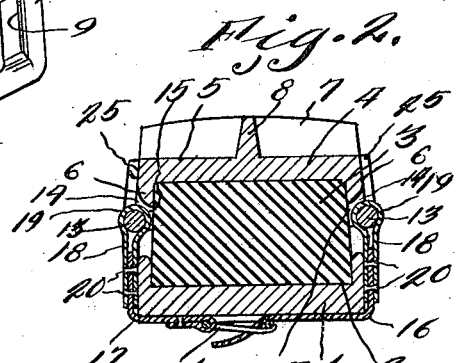
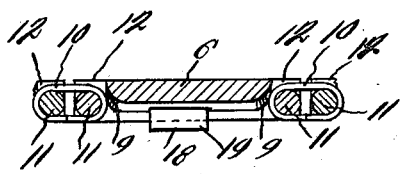
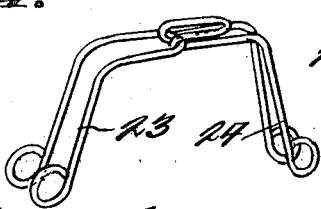
Witnesses
Inventor
D. B. McCollum
By D. Swift & Co.
Attorneys

UNITED STATES PATENT OFFICE.

DANIEL BOON McCOLLUM, OF CRANDALL, GEORGIA.

ANTISKIDDING DEVICE FOR TIRES.

1,261,827.  Specification of Letters Patent.  Patented Apr. 9, 1918.

Application filed February 9, 1916. Serial No. 77,248.

*To all whom it may concern:*

Be it known that I, DANIEL BOON MCCOLLUM, a citizen of the United States, residing at Crandall, in the county of Murray, State of Georgia, have invented a new and useful Antiskidding Device for Tires; and I do hereby declare the following to be a full, clear, and exact description of the invention, such as will enable others skilled in the art to which it appertains to make and use the same.

This invention relates to an improved antiskidding device or chain for tires, especially those of heavy truck wheels, and an object of the invention is to provide an improved device of this nature, in which simple, efficient and practical features of construction are involved.

One of the features of the invention is the provision of a device consisting of a plurality of arched plates, which are linked in sequence and extending about the tire of the wheel.

Another feature of the invention is the provision of ribs or flanges upon the outer face of each plate, one of which ribs extends at right angles to the other two ribs, and is curved outwardly, thereby preventing skidding of the wheel laterally as well as in the direction of rotation of the wheel.

Another feature of the invention is the provision of a wire securing means or strap for holding said plates on the tire.

In practical fields the details of construction may necessitate alterations, falling within the scope of what is claimed.

The invention comprises further features and combination of parts, as hereinafter set forth, shown in the drawings and claimed.

In the drawings:

Figure 1 is a view in side elevation of a portion of a wheel, showing the non-skidding device applied thereto.

Fig. 2 is a sectional view on line 2—2 of Fig. 1.

Fig. 3 is a detail perspective view of one of the non-skidding plates, showing the end flanges of the plate provided with a plurality of slots for the reception of means to secure the plates together and on the tire.

Fig. 4 is a sectional view on line 4—4 of Fig. 1, showing how the loops connect the plates together.

Fig. 5 is a detail of one of the loops for connecting said plates.

Fig. 6 is a detail view of a wire securing means for holding the plates on the tire.

Referring more especially to the drawings, 1 designates a wheel rim, in the channel 2 of which the usual tire 3 is arranged, and to which tire the non-skidding armor 4 is applied. This armor comprises a series of non-skidding plates. Each plate is arched as shown to fit over the tire and comprises the tread part 5 and the flanges 6, which substantially engage the sides of the tire. The tread part or portion of the plate is provided with a pair of transverse ribs or flanges 7, which prevent skidding or slipping of the wheel in the direction of the rotation of the wheel. Said tread part of each plate is also provided with an additional flange or rib 8, which extends from one rib or flange 7 to the opposite rib or flange 7, and constitutes means to prevent skidding of the wheel in a lateral direction. The flanges 6 (at their adjacent radial edges) are provided with slots 9, to receive the metallic loops or straps 10, to connect the plates in sequence, to form the non-skidding armor to fit the tire. The cylindrical parts 11 adjoining the slots 9, and which are engaged by the metallic loops 10 are reduced, or less in diameter than the thicknesses of the flanges 6. In other words, the inner faces of the flanges 6 exactly where the cylindrical parts 11 are formed, are recessed, as shown at 12, thereby preventing the inner parts of the metallic loops or straps from contacting with the side faces of the tire. The flanges 6 at their inner edges are provided with cylindrical beads 13, which merge into the cylindrical parts 11, and adjacent the beads 13, slots 14 are formed in said flanges. The inner faces of the flanges 6 adjoining the slots 14 are provided with recesses 15 of lengths corresponding to the lengths of the slots 14. As shown in Fig. 2 straps 16 and 17 are provided engaging the inner periphery of the rim 1, and their outer ends have metallic straps 18 (which are bent to form loops 19 to engage the cylindrical parts of the beads 13 in and adjacent the slots 14) riveted thereto as at 20. Where the loop ends of each strap 18 engage through the slot 14, the inner portion of the loop is received in the recess 15, thereby preventing the loop from engaging and injuring said tire. The inner end of each strap 17 is provided with a buckle 21 to be engaged by the inner end of the strap 16. By this construction of straps the non-skidding plates forming the armor are securely held on the tire.

In Fig. 6 a modified form of strap is provided for securing each plate in position, and this particular strap 22 also engages the inner periphery of the rim 1, and consists of the interlocked looped ends of the wire sections 23 and 24, the outer ends of which pass through the slots 14 and are coiled about the beads 13. The edges of the tread portion of each plate, as shown at 24, are longer than the ribs 7, thereby forming projections 25 beyond the ends of the ribs 7, to engage the ground, in case the vehicle, in turning a corner, should be running on two wheels. These projections are sharp cornered as shown, to insure against skidding. In other words, the flanges or ribs 7 are shorter than the width of the non-skidding plate, thereby causing the formation of the projections 25.

The invention having been set forth, what is claimed as new and useful is:

A tire protector consisting of a series of plates united in sequence, each plate having side flanges and provided adjacent the ends of the side flanges with projecting sharp corners, the tread of said plate having a pair of spaced ribs extending from the sharp corners of one side to the sharp corners of the opposite side, whereby the ends of said ribs and the sharp corners may dig into the road bed, the tread of said plate having a longitudinal rib between the first ribs and at right angles thereto, said longitudinal rib having its outer edge rounded.

In testimony whereof I have signed my name to this specification in the presence of two subscribing witnesses.

DANIEL BOON McCOLLUM.

Witnesses:
JOHN A. McCOLLUM,
GROVER C. BATES.